United States Patent [19]

Potter

[11] Patent Number: 4,510,252

[45] Date of Patent: Apr. 9, 1985
:::

[54] EASILY FORMED CHEMICALLY RESISTANT GLASS FIBERS

[75] Inventor: Russell M. Potter, Granville, Ohio

[73] Assignee: Owens-Corning Fiberglas Corporation, Toledo, Ohio

[21] Appl. No.: 553,283

[22] Filed: Nov. 18, 1983

[51] Int. Cl.³ .......................... C03C 13/00; C03C 3/08

[52] U.S. Cl. ........................................ 501/35; 501/38; 501/59; 501/66

[58] Field of Search .................. 501/35, 38, 59, 66

[56] References Cited

U.S. PATENT DOCUMENTS

| | | | |
|---|---|---|---|
| 2,308,857 | 1/1943 | Bowes | 501/35 |
| 3,013,888 | 12/1961 | de Lajarte | 501/38 |
| 3,513,002 | 5/1970 | Labino | 501/35 |
| 3,853,569 | 12/1974 | Laurent | 501/35 |
| 4,325,724 | 4/1982 | Froberg | 501/35 |

Primary Examiner—Mark Bell
Attorney, Agent, or Firm—Ronald C. Hudgens; Robert F. Rywalski

[57] ABSTRACT

A devitrification resistant, sulfuric acid resistant and water resistant glass fiber consisting essentially of $SiO_2$, $Al_2O_3$, CaO, MgO, $Na_2O$ and/or $K_2O$, $B_2O_3$, and optionally $Fe_2O_3$, and/or $TiO_2$ and/or $F_2$, said glass fiber having delta T of at least about 395° F. and a durability (% fiber weight loss at 96° C.) in water for 24 hours of less than about 1.6% and in 10% $H_2SO_4$ for 24 hours of less than about 1.1%.

4 Claims, No Drawings

EASILY FORMED CHEMICALLY RESISTANT GLASS FIBERS

TECHNICAL FIELD

The present invention relates to glass compositions and more particularly it relates to chemically resistent glass fiber compositions.

BACKGROUND AND SUMMARY OF THE INVENTION

C-Type glasses have long been known in the glass fiber industry as being suitable as reinforcing fibers when chemical durability is needed. These type fibers are essentially alkali, alkaline earth, alumino borosilicate compositions with an early C-Type composition being exemplified by U.S. Pat. No. 2,308,857. K. L. Lowenstein, in the book entitled The Manufacturing Technology of Continuous Glass Fibers (Elsevier Scientific Publishing Co., 1973), at page 29, discloses an exemplary C-Type glass composition of 65% $SiO_2$, 4% $Al_2O_3$, 5% $B_2O_3$, 3% MgO, 14% CaO, 8.5% $Na_2O$ and 0.5% $Fe_2O_3$. A more specific C-Type composition, which has been available for many years, is a composition of about 65.5% $SiO_2$, about 3.8% $Al_2O_3$, about 0.1% $Fe_2O_3$, about 13.7% CaO, about 2.4% MgO, about 8.9% of ($Na_2O+K_2O$), about 0.2% $TiO_2$, and about 5.5% $B_2O_3$.

C glass compositions have desirable chemical durability, for example, durability with respect to water and sulfuric acid but, unfortunately, in forming such fibers, there is a propensity for the fibers to devitrify, that is, crystallize. The reason for this is that the so called "delta T", that is, the difference in temperature between (1) the temperature at which the glass has a viscosity (in poise) of log 2.5 and (2) the liquidus temperature, is low. As an example, the above-indicated commercially available C glass has a delta T of about 275° F. with a liquidus temperature of about 2034° F. and a log 2.5 viscosity at a temperature of about 2309° F. Those skilled in the art will readily realize the inefficiencies that result when a stream of molten C glass is attenuated into fibers and such fibers devitrify.

In accordance with the present invention, an improved devitrification resistant, sulfuric acid resistant, and water resistant glass fiber is provided which fibers can be formed using conventional, continuous glass fiber forming technology without significant fear of devitrification. By employing the present formulations, improved forming efficiencies will be realized and, in some instances, the batch cost of these fibers will be less than previous conventional C-Type glass formulations. The present glasses will have a significantly higher delta T and their chemical durability will be at least as good as previous commercially available C glass fibers. Thus, in accordance with the present invention, there is provided a devitrification resistant, sulfuric acid resistant and water resistant glass fiber consisting essentially of, in weight percent, about 67% to about 70% $SiO_2$, about 3% to about 4% $Al_2O_3$, about 10% to about 13% CaO, about 2% to about 3% MgO, about 7% to about 10% of ($Na_2O+K_2O$), desirably about 7 to less than 10% of $Na_2O$, about 3% to about 6% $B_2O_3$, and less than about 1% of each of $Fe_2O_3$, $TiO_2$ and $F_2$, said glass fiber having a delta T of at least about 395° F. and a durability (% fiber weight loss at 96° C.) in water for 24 hours of less than about 1.6% and in 10% $H_2SO_4$ for 24 hours of less than about 1.1%.

DESCRIPTION AND INDUSTRIAL EXPLOITATION

The above formulations can be formed into fibers using conventional technology whereby molten streams of glass are attenuated into continuous glass fibers and wound on conventional winders. Conventional glass forming raw materials, or batch, may be employed in forming the compositions of the present invention.

Table 1 below summarizes the data for four glass compositions, Examples 3 and 4 respectively exemplify the present inventive compositions, Example 2 exemplifies Example 1 of U.S. Pat. No. 3,513,002 and Example 1 also exemplifies Example 1 of U.S. Pat. No. 3,513,002, but without such additives as fluorine, zinc oxide, and barium oxide. In comparing Examples 1 and 2 with Examples 3 and 4, it will be noted that Examples 1 and 2 have a significantly less alkaline earth metal oxide content and a corresponding significantly higher alkali metal oxide content. Such compositions as Examples 1 and 2 have a significantly higher delta T than is required and the batch raw material costs are higher than for the glasses of the present invention.

TABLE 1

|  | 1 | 2 | 3 | 4 |
|---|---|---|---|---|
| $SiO_2$ | 68.60 | 68.60 | 67.58 | 69.23 |
| $Al_2O_3$ | 4.10 | 4.10 | 3.76 | 3.76 |
| CaO | 5.60 | 5.00 | 10.99 | 12.10 |
| MgO | 2.60 | 2.60 | 2.35 | 2.35 |
| $B_2O_3$ | 5.90 | 5.90 | 5.70 | 4.32 |
| $Na_2O$ | 12.40 | 11.90 | 9.39 | 8.00 |
| $K_2O$ | 0.80 | 0.80 | — | — |
| $F_2$ | — | 0.70 | — | — |
| ZnO | — | 0.20 | — | — |
| BaO | — | 0.20 | — | — |
| $Fe_2O_3$ | — | — | 0.08 | 0.09 |
| $TiO_2$ | — | — | 0.15 | 0.15 |
| log 2.5 visc temp. (°F.) | 2374 | 2391 | 2378 | 2458 |
| liquidus (°F.) | 1718 | 1743 | 1983 | 2052 |
| delta T | 656° F. | 648° F. | 395° F. | 406° F. |
| durability (% fiber wt. loss at 96° C. when soaked for the time indicated) | | | | |
| $H_2O$  4 hr. | 0.82 ± 0.10 | 0.79 ± 0.18 | 0.74 ± 0.16 | 0.74 ± 0.05 |
| "  24 hrs | 1.58 ± 0.11 | 1.25 ± 0.07 | 1.31 ± 0.04 | 1.33 ± 0.27 |
| 10% $H_2SO_4$  4 hr. | 0.53 ± 0.09 | 0.55 ± 0.14 | 0.70 ± 0.16 | 0.54 ± 0.22 |
| "  24 hrs | 1.46 ± 0.30 | 1.01 ± 0.32 | 0.96 ± 0.11 | 0.70 ± 0.08 |

Having described my invention, it will of course be apparent that modifications are possible which, pursuant to the patent statutes and laws, do not depart from the spirit and scope thereof.

I claim:

1. A devitrification resistant, sulfuric acid resistant and water resistant glass fiber consisting essentially of in approximate weight percent 67.6% $SiO_2$, 3.8% $Al_2O_3$, 11% CaO, 2.4% MgO, 5.7% $B_2O_3$, 9.4% $Na_2O$ and less than 0.3% of ($Fe_2O_3+TiO_2$) said glass fiber having a liquidus temperature of about 1980° F. and the glass fiber having a viscosity, in poise, of 10 to the 2.5 power at a temperature of about 2380° F., said fiber having the following durabilities (% fiber weight loss at 96° C.)

(i) water for 4 hours—less than about 0.90%

(ii) water for 24 hours—less than about 1.35%
(iii) 10% $H_2SO_4$ for 4 hours—less than about 0.86%
(iv) 10% $H_2SO_4$ for 24 hours—less than about 1.07%, said glass having a delta T of about 395° F.

2. A devitrification resistant, sulfuric acid resistant and water resistant glass fiber consisting essentially of in approximate weight percent 69.2% $SiO_2$, 3.8% $Al_2O_3$, 12.1% CaO, 2.4% MgO, 4.3% $B_2O_3$, 8% $Na_2O$ and less than 0.3% of ($Fe_2O_3+TiO_2$), said glass fiber having a liquidus temperature of about 2050° F. and the glass fiber having a viscosity, in poise, of 10 to the 2.5 power at a temperature of about 2460° F., said fiber having the following durabilities (% fiber weight loss at 96° C.)
  (i) water for 4 hours—less than about 0.79%
  (ii) water for 24 hours—less than about 1.60%
  (iii) 10% $H_2SO_4$ for 4 hours—less than about 0.76%
  (iv) 10% $H_2SO_4$ for 24 hours—less than about 0.78%, said glass having a delta T of about 406° F.

3. A devitrification resistant, sulfuric acid resistant and water resistant glass fiber consisting essentially of in approximate weight percent 67% to 70% $SiO_2$, 3% to 4% $Al_2O_3$, 10% to 13% CaO, 2% to 3% MgO, 7% to 10% of ($Na_2O+K_2O$), 3 to 6% $B_2O_3$, and less than 1% of each of $Fe_2O_3$, $TiO_2$ and $F_2$, said glass fiber having a delta T of at least about 395° F. and a durability (% fiber weight loss at 96° C.) in water for 24 hours of less than about 1.6% and in 10% $H_2SO_4$ for 24 hours of less than about 1.1%, said glass having a viscosity, in poise, of 10 to the 2.5 power at a temperature of about 2350° F. to about 2500° F.

4. The glass fiber of claim 3 wherein said glass is substantially free of $K_2O$ and wherein the $Na_2O$ is present in an amount of 7% to less than 10%.

* * * * *